(12) United States Patent
Wagner et al.

(10) Patent No.: US 9,256,956 B2
(45) Date of Patent: Feb. 9, 2016

(54) DATASET CREATION FOR TRACKING TARGETS WITH DYNAMICALLY CHANGING PORTIONS

(75) Inventors: Daniel Wagner, Vienna (AT); Zsolt Szabolcs Szalavari, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 600 days.

(21) Appl. No.: 13/117,472

(22) Filed: May 27, 2011

(65) Prior Publication Data

US 2011/0293140 A1    Dec. 1, 2011

Related U.S. Application Data

(60) Provisional application No. 61/349,481, filed on May 28, 2010.

(51) Int. Cl.
*G06K 9/46* (2006.01)
*G06T 7/20* (2006.01)

(52) U.S. Cl.
CPC ....... *G06T 7/204* (2013.01); *G06T 2207/10016* (2013.01)

(58) Field of Classification Search
USPC ............... 382/103, 154, 294, 282–283, 190
See application file for complete search history.

(56) References Cited

U.S. PATENT DOCUMENTS

| 102,103 A | 4/1870 | Feust |
| 5,034,986 A * | 7/1991 | Karmann ................. G06K 9/32 348/169 |
| 5,594,850 A * | 1/1997 | Noyama ................ G06T 15/405 345/632 |
| 6,674,925 B1 * | 1/2004 | Schoepflin et al. ........... 382/308 |
| 6,717,518 B1 * | 4/2004 | Pirim ........................ B60R 1/04 340/576 |
| 6,993,167 B1 * | 1/2006 | Skladnev ............... A61B 5/444 382/128 |
| 7,133,537 B1 * | 11/2006 | Reid ...................... G06T 7/2053 348/169 |
| 7,424,167 B1 | 9/2008 | Chosak et al. |

(Continued)

FOREIGN PATENT DOCUMENTS

| CN | 101986348 A | 3/2011 |
| JP | 63247680 A * | 10/1988 ................ G01S 3/78 |

(Continued)

OTHER PUBLICATIONS

Image subtraction—Extraction, Desa et al., IEEE, 0-7695-2178-9, 2004, pp. 1-5.*

(Continued)

*Primary Examiner* — Jayesh A Patel
(74) *Attorney, Agent, or Firm* — Silicon Valley Patent Group LLP

(57) ABSTRACT

A mobile platform visually detects and/or tracks a target that includes a dynamically changing portion, or otherwise undesirable portion, using a feature dataset for the target that excludes the undesirable portion. The feature dataset is created by providing an image of the target and identifying the undesirable portion of the target. The identification of the undesirable portion may be automatic or by user selection. An image mask is generated for the undesirable portion. The image mask is used to exclude the undesirable portion in the creation of the feature dataset for the target. For example, the image mask may be overlaid on the image and features are extracted only from unmasked areas of the image of the target. Alternatively, features may be extracted from all areas of the image and the image mask used to remove features extracted from the undesirable portion.

26 Claims, 4 Drawing Sheets

(56) References Cited

U.S. PATENT DOCUMENTS

| | | | |
|---|---|---|---|
| 7,447,359 B2* | 11/2008 | Tu et al. | 382/173 |
| 7,724,962 B2* | 5/2010 | Zhu | G06K 9/3241 340/937 |
| 7,860,311 B2 | 12/2010 | Chen et al. | |
| 8,098,904 B2* | 1/2012 | Ioffe | G06K 9/00281 382/118 |
| 8,179,556 B2* | 5/2012 | Salgado | G06F 17/212 358/1.14 |
| 8,203,609 B2* | 6/2012 | Jung | H04N 1/0084 348/143 |
| 8,320,620 B1* | 11/2012 | Cohen | 382/103 |
| 8,830,262 B2* | 9/2014 | Haskell | G09G 5/377 345/629 |
| 2004/0054473 A1 | 3/2004 | Shimomura | |
| 2005/0129272 A1* | 6/2005 | Rottman | G06K 9/00228 382/103 |
| 2005/0147303 A1* | 7/2005 | Zhou et al. | 382/190 |
| 2006/0026148 A1* | 2/2006 | Furuhashi | G06F 17/30244 |
| 2008/0069400 A1* | 3/2008 | Zhu | G06K 9/3241 382/103 |
| 2008/0130744 A1* | 6/2008 | Huang et al. | 375/240.08 |
| 2008/0187219 A1* | 8/2008 | Chen | G06K 9/00711 382/173 |
| 2009/0074246 A1 | 3/2009 | Distante et al. | |
| 2009/0102937 A1* | 4/2009 | Yilmaz et al. | 348/222.1 |
| 2009/0196475 A1* | 8/2009 | Demirli | A61B 5/441 382/128 |
| 2009/0279752 A1* | 11/2009 | Sirohey | G06K 9/00 382/128 |
| 2010/0074477 A1* | 3/2010 | Fujii | G06K 9/00604 382/117 |
| 2010/0328460 A1* | 12/2010 | Merkel | G06K 9/00771 348/143 |
| 2011/0142349 A1* | 6/2011 | Saijo | G06K 9/00355 382/195 |

FOREIGN PATENT DOCUMENTS

| | | |
|---|---|---|
| JP | H06274625 A | 9/1994 |
| JP | 2005071344 A | 3/2005 |
| JP | 2005309485 | 11/2005 |
| JP | 2006012042 A | 1/2006 |
| JP | 2006040199 | 2/2006 |

OTHER PUBLICATIONS

Image subtraction—extraction., Desa et al. IEEE, 0-7695-2178-9, 2004, pp. 1-5.*

Appearance—Masks, Edwards et al, IEEE, 1063-6919, 1997, pp. 533-539.*

Desa et al. "Image subtraction for real time moving object extraction." Computer Graphics, Imaging and Visualization, 2004. CGIV 2004. Proceedings. International Conference [Online] 2004, pp. 41.

Chien et al., "Adaptive window method with sizing vectors for reliable correlation-based target tracking", Pattern Recognition, Elsevier, GB, vol. 33, No. 2, Feb. 1, 2000, pp. 237-249, XP004243840, ISSN: 0031-3203, DOI: 10.1016/S0031-3203(99)00056-4.

International Search Report and Written Opinion—PCT/US2011/038429—ISA/EPO—Oct. 6, 2011.

* cited by examiner

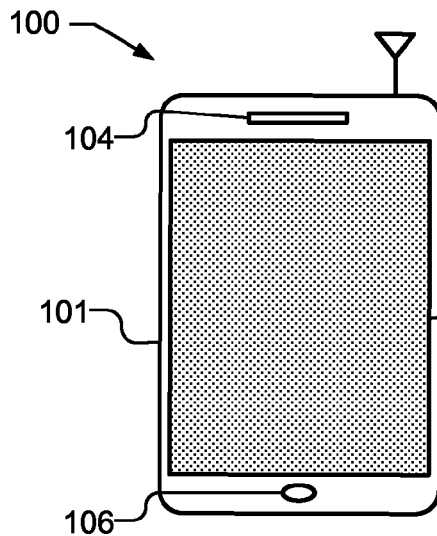
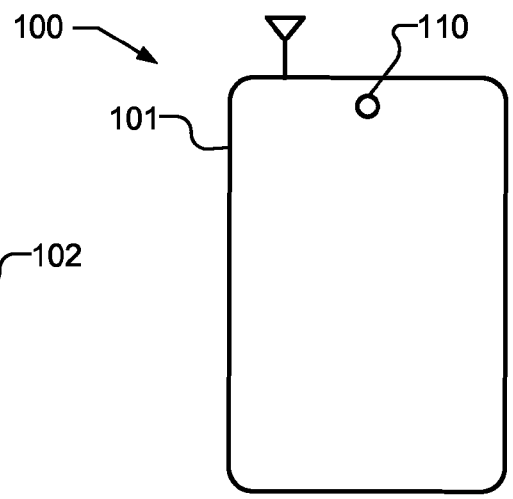
Fig. 1A  Fig. 1B
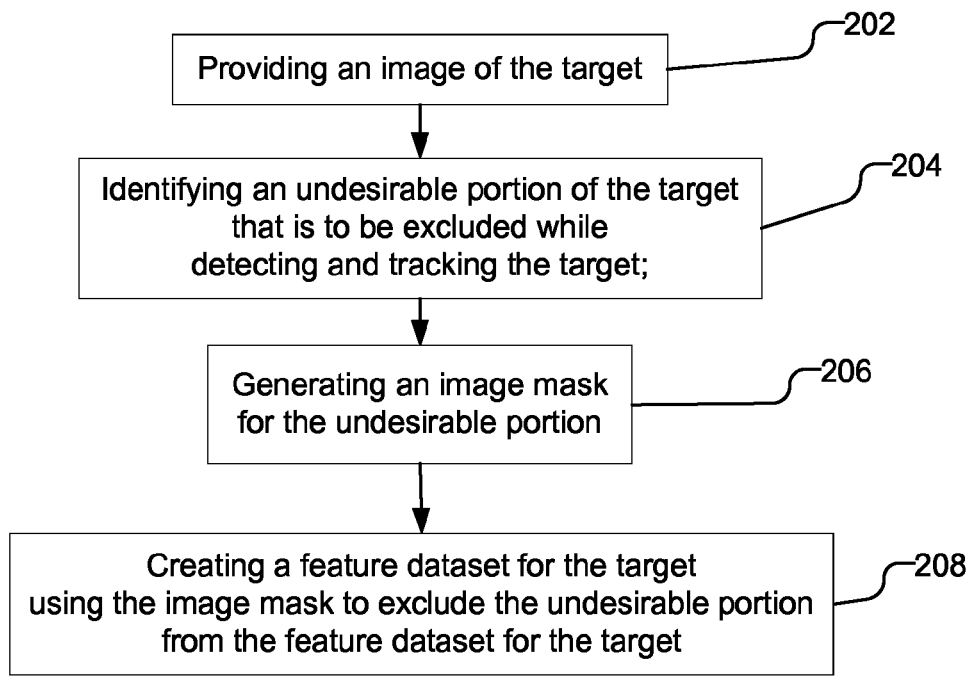
Fig. 2

DATASET CREATION FOR TRACKING TARGETS WITH DYNAMICALLY CHANGING PORTIONS

CROSS-REFERENCE TO PENDING PROVISIONAL APPLICATION

This application claims priority under 35 USC 119 to U.S. Provisional Application No. 61/349,481, filed May 28, 2010, and entitled "Dynamic Tracking Targets For Augmented Reality" which is assigned to the assignee hereof and which is incorporated herein by reference.

BACKGROUND

Model-based visual detection and tracking of rigid objects usually assumes that the appearance of those objects does not change at run-time or after datasets for those objects have been created. In practice however, many objects do not fall into this category. For example, a (turned-on) television set, shows unpredictable content on the screen, whereas the rest of the television set, e.g., the frame, etc., does not change. Another example is an object that partially consists of strongly reflective material, such as a mirror on a wall, includes an area of unpredictable content (reflection), while the frame does not change. Yet another example is the radio in the dashboard of a car, or any other device with a display, includes a dynamically changing portion (the display) and a static portion (the controls and frame). Current methods cannot model areas with a changing appearance, which consequently, creates difficulties with image based detection and tracking using images of objects with dynamically changing areas.

SUMMARY

A mobile platform visually detects and/or tracks a target that includes a dynamically changing portion, or otherwise undesirable portion, using a feature dataset for the target that excludes the undesirable portion. The feature dataset is created by providing an image of the target and identifying the undesirable portion of the target. The identification of the undesirable portion may be automatic or by user selection. An image mask is generated for the undesirable portion. The image mask is used to exclude the undesirable portion in the creation of the feature dataset for the target. For example, the image mask may be overlaid on the image and features are extracted only from unmasked areas of the image of the target. Alternatively, features may be extracted from all areas of the image and the image mask used to remove features extracted from the undesirable portion.

In one aspect, a method includes providing an image of a target, identifying an undesirable portion of the target, generating an image mask for the undesirable portion, and creating a feature dataset for the target using the image mask to exclude the undesirable portion from the feature dataset for the target.

In another aspect, an apparatus includes a processor; memory connected to the processor, a display connected to the memory; and software held in the memory and run in the processor. The software causes the processor to identify in an image an undesirable portion of a target, generate an image mask for the undesirable portion; and create a feature dataset for the target using the image mask to exclude the undesirable portion from the feature dataset for the target.

In another aspect, a system includes means for providing an image of a target, means for identifying an undesirable portion of the target, means for generating an image mask for the undesirable portion, and means for creating a feature dataset for the target using the image mask to exclude the undesirable portion from the feature dataset for the target.

In yet another aspect, a computer-readable medium including program code stored thereon includes program code to identify in a captured image an undesirable portion of a target, program code to generate an image mask for the undesirable portion; and program code to create a feature dataset for the target using the image mask to exclude the undesirable portion from the feature dataset for the target.

BRIEF DESCRIPTION OF THE DRAWING

FIGS. 1A and 1B illustrate a front side and back side, respectively, of a mobile platform capable of image based detection and tracking using objects with dynamically changing, or otherwise undesirable portions.

FIG. 2 illustrates a flow chart illustrating the process of creating a masked dataset for detecting and tracking a target with dynamically changing portions.

DETAILED DESCRIPTION

Figure 3A:
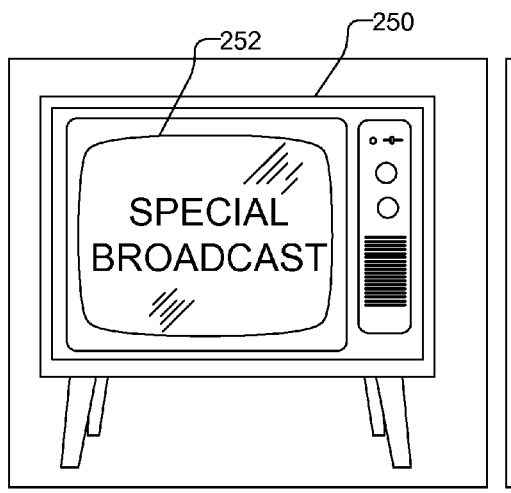
FIGS. 3A, 3B, 3C, and 3D illustrate using an image mask to generate a natural feature dataset of a target in the form of a television, where the image mask excludes features from the screen of the television.

FIGS. 1A and 1B illustrate a front side and back side, respectively, of a mobile platform 100, capable of image based detection and tracking using objects with dynamically changing portions. The mobile platform 100 is illustrated as including a housing 101, a display 102, which may be a touch screen display, as well as a speaker 104 and microphone 106. The mobile platform 100 further includes a camera 110 to image the environment.

The mobile platform 100 uses natural feature based detection, in which previously determined "natural features" on a target are detected and tracked in a live camera image at run-time. It should be understood that as used herein the term image or captured image denotes a still image or a frame of video captured by the camera 110. The target is a real world object that can be detected and tracked using an image of the target (sometimes referred to as an input image of the target) and by processing the image to extract natural features from the target to generate a natural feature dataset. The target is detected by comparing the natural feature dataset created from the input image (sometimes referred to as a reference image) of the target to set of features extracted from a live camera image at run-time. As result of the detection of the target, an estimate of the camera position and orientation (pose) in relation to the target is computed as geometric transformation. Tracking denotes the process of updating the pose estimate in consecutive camera frames over a period of time. Tracking typically assumes knowledge of the rough position of the target, as the target has been detected or tracked in a previous image, and updates the pose in the current frame. It should be understood, however, that detection and tracking are sometimes used interchangeably. For example, in "tracking by detection" it is possible to track a target by detecting the target in every frame. Accordingly, detection and tracking is used herein in a generic sense and is intended to denote only one of or both of detection and tracking.

The mobile platform 100 is capable of detecting and tracking targets with dynamically changing portions by ignoring the dynamically changing portions. The dynamically changing portions are ignored by generating a natural feature dataset for the target using a mask image that is virtually overlaid on top of the target and prevents features from the dynamically changing portion of the target from being added to the natural feature dataset. As a result, the natural feature dataset does not contain features that will not be available at run-time and at the same time the natural feature dataset becomes smaller improving the overall performance. Masking out areas that cannot be detected prevents useless data from being stored in the natural feature dataset. The tracking speed and robustness is thereby improved as the tracking unit can ignore parts of the camera image that do not contain useful data. Additionally, detection performance is improved due to the reduced size of the natural feature dataset.

The natural feature dataset, which does not contain features from dynamically changing portions of the target, may be generated by the mobile platform 100 itself or by an external source. For example, the mobile platform 100 may generate a masked natural feature dataset for the target any time prior to detection and tracking of the target. Alternatively, the mobile platform 100 may receive a masked natural feature dataset from an external source prior to detection and tracking of the target. For example, the external source, which may be separate processor, may generate the masked natural feature dataset using one or more images of the target provided by the mobile platform 100 or any other available source.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of AR.

FIG. 2 illustrates a flow chart illustrating the process of creating a masked dataset for detecting and tracking a target with dynamically changing portions. The masked dataset may be generated by, e.g., mobile platform 100 or by an external source and provided to the mobile platform 100 prior to detection and tracking of the target. As illustrated, an image of the target is provided (202), e.g., by capturing a still image or frame of video of the target by the camera 110 of the mobile platform or by receiving the image from another source. An undesirable portion of the target is identified (204). The undesirable portion is the portion of the target that is to be excluded while detecting and/or tracking the target, e.g., the dynamically changing portion. The undesirable portion may be identified by selection or automatically. For example, the image of the target may be displayed to the user, e.g., on the display 102 of the mobile platform, and the user is prompted to identify any undesirable portions. An undesirable portion may be selected by the user through a graphical interface, controlled using a touch screen display or using a cursor and a keyboard or any other appropriate user interface devices, which may be provided on the mobile platform 100 or the external device creating the masked dataset. Additionally or alternatively, the undesirable portion may be identified automatically by capturing multiple images of the target over time and/or at different positions and comparing extracted features from the multiple images to identify portions that change over time or change based on position of the mobile platform (e.g., as caused by reflective surfaces).

Using the identified undesirable portion, an image mask is generated for the undesirable portion (206). A natural feature dataset is created for the target using the image mask to exclude the undesirable portion from the natural feature dataset for the target (208). For example, the image mask may be overlaid on the image of the target and features extracted from unmasked areas of the image, e.g., using known feature extraction techniques, such as Scale Invariant Feature Transform (SIFT), or Speeded-up Robust Features (SURF), or any other desired method. Alternatively, the feature dataset may be created by extracting features from all areas of the image and using the image mask to remove features extracted from the undesirable portion.

The masked natural feature dataset is stored in the mobile platform 100, after being received from the external source if created by the external source, and used for detection and tracking of the target with the mobile platform. The detection and tracking of the target may be used for any desired application, such as augmented reality (AR) type applications.

Figure 3B:
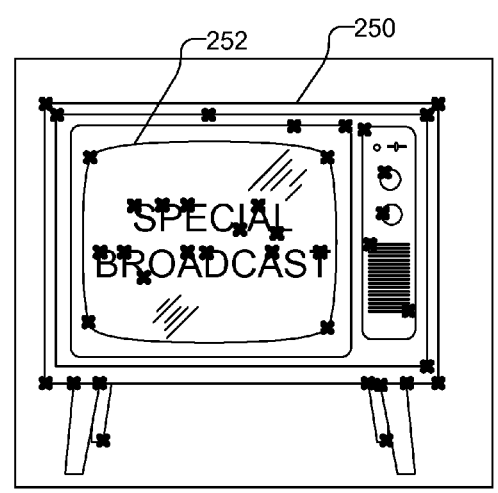

FIGS. 3A, 3B, 3C, and 3D illustrate using an image mask to generate a natural feature dataset of a target that excludes features from undesirable portions of the target. FIG. 3A illustrates an image of a television 250, e.g., captured by the mobile platform 100, that includes a screen 252 displaying the text "Special Broadcast". The screen 252 is an undesirable portion of the target as it dynamically changes over time. Moreover, reflections that may be seen in the screen 252 change based on the position of the mobile platform 100. FIG. 3B illustrates a natural feature dataset for the image of the television 250. Each identified feature is illustrated by an "x". It should be understood that the natural feature dataset illustrated in FIG. 3B is merely exemplary and that many more features will typically be identified. The natural feature dataset is created by analyzing the input image with a set of functions and extracting the features using techniques such as SIFT, SURF, or any other desired feature extraction technique.

Figure 3C:
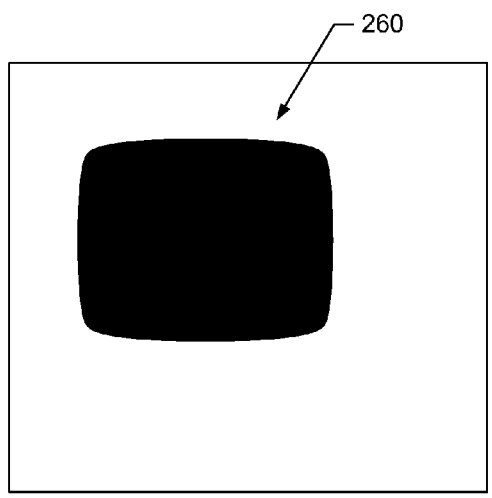

As can be seen in FIG. 3B, natural features are extracted from the dynamically changing portion, i.e., screen 252, of the television 250, as well as the remainder of the television 250, which does not change. To allow for the dynamic tracking of the target, i.e., television 250, an image mask 260 shown in FIG. 3C is created to be used to mask out the undesired portions (e.g., dynamically changing portions of the target) from the target image during the detection or the tracking process. The image mask 260 in FIG. 3C is in the shape of the screen 252. The image mask 260 may be identified by user selection or automatically, as discussed above. For example, a user may identify the screen 252 as the undesirable portion of the television 250, e.g., using a graphical interface. Thus, the image mask 260 may be created and applied prior to generation of the natural feature dataset, shown in FIG. 3B. Alternatively, the screen 252 may be automatically identified as an undesirable portion using multiple images of the television 250 in which different images are displayed in the screen 252 and, thus, different features are extracted from the screen 252 in each image of the television 250, while the features extracted from the remainder of the television 250 do not change.

Figure 3D:
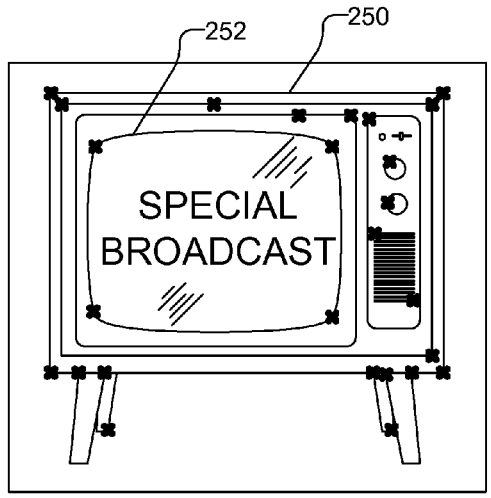

FIG. 3D illustrates an image of the television 250 after the image mask 260 is applied to exclude the undesirable portion, i.e., the screen 252, from the natural feature dataset for the television 250. Thus, the features from screen 252 are excluded in the masked dataset of FIG. 3D. Using the image mask 260 to generate a masked dataset, shown in FIG. 3D, a much more robust detection and tracking performance can be achieved for cases when portions of the target dynamically change or are otherwise undesirable. The detection and tracking of the target may then be used for any desired application, such as augmented reality (AR) type applications, in which information, such as help information, is overlaid on the image of the target in the display 102 of the mobile platform 100.

It should be understood that the target is not limited to a television, but any target may be any object that may include a dynamically changing portion. For example, the target may be a car radio or any other object in which a portion is not appropriate for dataset generation as the appearance can changes with time or position of the mobile platform 100. By way of illustration, the undesirable portion of the target may vary based on the position of the mobile platform 100 when the image is captured. Images of a target with reflective surfaces, such as mirrors or glass in windows or picture frames, may include the reflection of different objects depending on the position of the mobile platform 100 when the image is produced. Thus, reflective surfaces of targets may be an undesirable portion for detection and tracking.

Figure 4A:
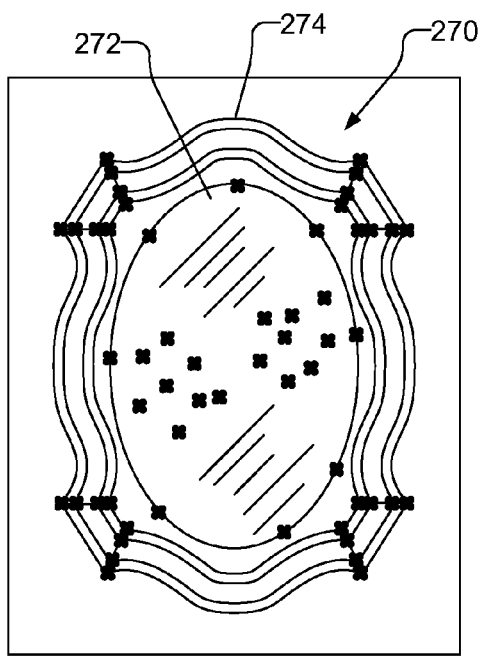
FIGS. 4A, 4B, and 4C illustrate using an image mask to generate a natural feature dataset of a target in the form of a mirror, where the image mask excludes features from the reflective surface of the mirror.
Figure 4B:
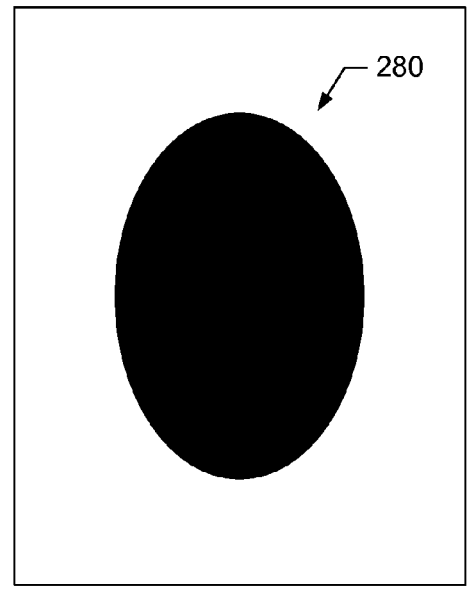
Figure 4C:
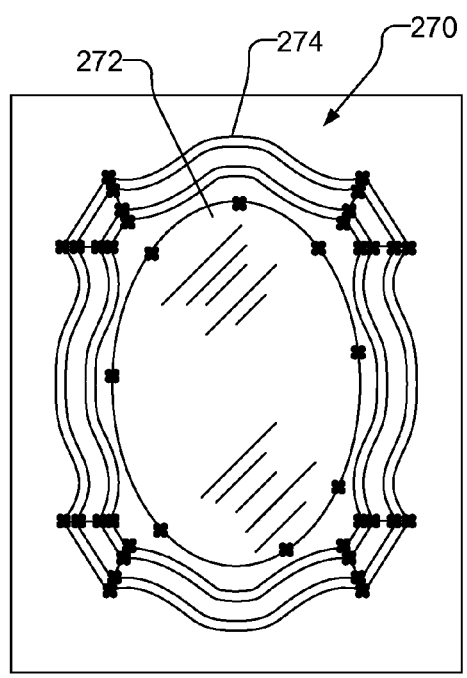

FIGS. 4A, 4B, and 4C illustrate using an image mask to generate a natural feature dataset of a target in the form of a mirror 270, where the image mask excludes features from the reflective surface 272 of the mirror 270, but not the frame 274 of the mirror 270. FIG. 4A illustrates an image of the mirror 270, with a reflective surface 272 and frame 274. The natural feature dataset for the image of the mirror 270 is illustrated with "x"s. As can be seen in FIG. 4B, without an image mask, natural features are extracted from the dynamically changing portion, i.e., the reflective surface 272, of the mirror 270, as well as the remainder of the mirror 270.

FIG. 4B illustrates an image mask 280 that is created to mask out the undesired portions (e.g., dynamically changing portions of the target) from the target image of the mirror 270 during the detection or the tracking process. The image mask 280 in FIG. 4B is in the shape of the reflective surface 272 and may be created by user selection or automatically. For example, a user may identify the reflective surface 272 as the undesirable portion of the mirror 270, e.g., using a graphical interface. Alternatively, the reflective surface 272 may be automatically identified as an undesirable portion using multiple images of the mirror 270 from different positions in which different objects are reflected in the reflective surface 272.

FIG. 4C illustrates an image of the mirror 270 after the image mask 280 is applied to exclude the undesirable portion, i.e., the reflective surface 272, from the natural feature dataset for the television 250. Thus, the features from mirror 270 are excluded in the masked dataset of FIG. 4C, to produce a masked dataset from only static portions of the mirror 270 to be used at run-time for detection and tracking.

Another example of a target that may include dynamically changing portions is product packaging. Product packaging may include areas that vary by product type, as well as static areas that do not change by product type, such as brand information, logos etc. Thus, an image mask may be generated to exclude feature extraction from areas of the product packing that is variable, while permitting feature extraction from static, i.e., unchanging portions, of the product packaging. Product packaging is an example of a target for which the masked natural feature dataset may be produced by the manufacturer, rather than the mobile platform 100. Other undesirable portions of a target may include, e.g., areas that are unsuitable for detection, such as a texture-less or repetitively textured surface.

Figure 5:
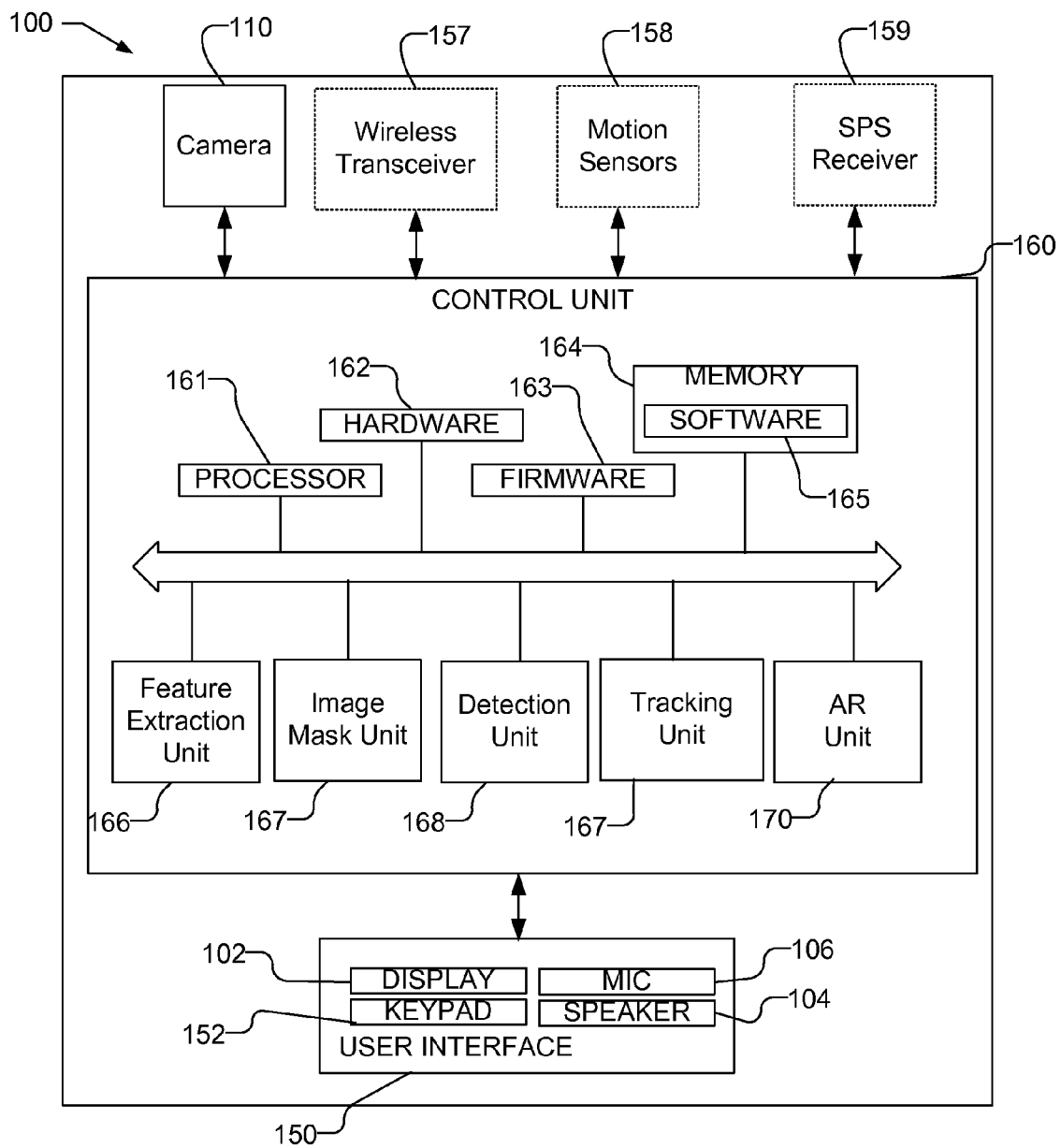
FIG. 5 is a block diagram of a mobile platform capable creating a masked dataset for detecting and tracking a target with dynamically changing portions.

FIG. 5 is a block diagram of a mobile platform 100 capable creating a masked dataset for detecting and tracking a target with dynamically changing portions and using the masked dataset for detection and tracking of the target.

It should be understood, as discussed above, that the masked dataset may be created by sources external to the mobile platform, such as a computer or server with an external interface through which the masked dataset may be provided to the mobile platform 100. Such an external computer or server used to create the masked dataset may be similar to the structure shown in FIG. 5, but without the elements required for mobility, such as the wireless transceiver 157 (which may be replaced with a wired interface), motion sensors 158, SPS receiver 159, as well as the camera 110.

Referring back to FIG. 5, the mobile platform 100 includes the camera 110 as well as a user interface 150 that includes the display 102 capable of displaying images captured by the camera 110. The user interface 150 may also include a keypad 152 or other input device through which the user can input information into the mobile platform 100, such as identification of an undesirable portion of a target. If desired, the keypad 152 may be obviated by integrating a virtual keypad into the display 102 with a touch sensor. The user interface 150 may also include a microphone 106 and speaker 104, e.g., if the mobile platform is a cellular telephone.

Mobile platform 100 may include a wireless transceiver 157, which may be used to receive external information, such as an image mask or a masked dataset produced by an external source, such as the manufacturer of product packaging that includes changeable portions, as discussed above. The mobile platform 100 may optionally include additional features that may be helpful for AR applications, such as a motion sensor 158 including, e.g., accelerometers, gyroscopes, electronic compass, or other similar motion sensing elements, and a satellite positioning system (SPS) receiver 159 capable of receiving positioning signals from an SPS system. Of course, mobile platform 100 may include other elements unrelated to the present disclosure.

The mobile platform 100 also includes a control unit 160 that is connected to and communicates with the camera 110 and user interface 150, along with other features, such as the wireless transceiver 157, motion sensor 158 and SPS receiver 159 if used. The control unit 160 accepts and processes data from the camera 110 and controls the display 102 in response, as discussed above. The control unit 160 may be provided by a processor 161 and associated memory 164, hardware 162, software 165, and firmware 163. The mobile platform 100 may include a feature extraction unit 166 that extracts features from images captured by the camera 110. The mobile platform 100 may also include an image mask unit 167 that is used to generate an image mask of a captured image, either with user input via the user interface 150 or automatically, as discussed above, or to receive the image mask from an external source, e.g., for product packaging. The feature extraction unit 166 and image mask unit 167 may be used to generate the masked feature dataset for the target, which may be stored in memory 164. If desired, the external source may provide the masked feature dataset for a target, which is similarly stored in memory 164. The control unit 160 further includes a detection unit 168 for extracting and matching features from images captured by the camera 110 with the stored masked feature dataset and includes a tracking unit 169 for tracking the target using the matched features. The control unit 160 may further include, e.g., an augmented reality (AR) unit 170 to generate and display AR information on the display 102 based on tracking information provided by the tracking unit 169. The feature extraction unit 166, image mask unit 167, detection unit 168, tracking unit 169, and AR unit 170 are illustrated separately and separate from processor 161 for clarity, but may be a single unit and/or implemented in the processor 161 based on instructions in the software 165 which is run in the processor 161. It will be understood as used herein that the processor 161, as well as one or more of the feature extraction unit 166, image mask unit 167, detection unit 168, tracking unit 169, and AR unit 170 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    providing an image of a target, the target being an object to be tracked using image based detection and tracking;
    identifying an undesirable portion within the target, wherein the undesirable portion is a dynamically changing region of the target;
    generating an image mask for the undesirable portion within the target;
    extracting features from the target in the image of the target to create a feature dataset for the target and using the image mask to exclude features within the undesirable portion within the target from the feature dataset for the target, wherein extracting the features from the target in the image of the target to create the feature dataset for the target and using the image mask comprises overlaying the image mask on the undesirable portion within the target in the image of the target and extracting the features within unmasked areas of the target or extracting the features within all areas of the target in the image of the target and using the image mask to remove the features extracted within the undesirable portion within the target from the feature dataset; and
    storing the feature dataset for the image based detection and tracking of the target, wherein the undesirable portion of the target is excluded from the stored feature dataset and features from remaining portions of the target are included in the stored feature dataset.

2. The method of claim 1, wherein the undesirable portion is a display screen or a reflective surface.

3. The method of claim 1, wherein identifying the undesirable portion within the target comprises receiving a user input to identify the undesirable portion.

4. The method of claim 1, wherein identifying the undesirable portion within the target comprises:
    capturing a plurality of images of the target;
    extracting features from each of the plurality of images of the target;
    identifying a region of the target with features that change in the plurality of images of the target as the undesirable portion.

5. The method of claim 1, further comprising detecting the target in a captured image using the feature dataset for the target with the undesirable portion within the target excluded from the feature dataset.

6. An apparatus comprising:
    a processor;
    memory connected to the processor;
    a display connected to the memory; and
    software held in the memory and run in the processor to cause the processor to identify in an image an undesirable portion within a target, wherein the undesirable portion is a dynamically changing region of the target, the target being an object to be tracked using image based detection and tracking, generate an image mask for the undesirable portion within the target; extract features from the target in the image of the target to create a feature dataset for the target and use the image mask to exclude features within the undesirable portion from the feature dataset for the target, wherein the software causes the processor to extract features from the target in the image of the target to create the feature dataset for the target and use the image mask by causing the processor to overlay the image mask on the undesirable portion within the target in the image of the target and extract features within unmasked areas of the target or by causing the processor to extract features within all areas of the target in the image of the target and use the image mask to remove a subset of the features that were extracted within the undesirable portion within the target from the feature dataset; and store in the memory the feature dataset for the image based detection and tracking of the target, wherein the undesirable portion of the target is excluded from the feature dataset and features from remaining portions of the target are included in the stored feature dataset.

7. The apparatus of claim 6, wherein the undesirable portion is a display screen or a reflective surface.

8. The apparatus of claim 6, wherein the apparatus further comprises a user interface, the software causes the processor to identify the undesirable portion within the target by receiving a user selection of the undesirable portion.

9. The apparatus of claim 6, wherein the processor receives a plurality of images of the target, the software causes the processor to identify the undesirable portion within the target by causing the processor to exact features from each of the plurality of images of the target and identify as the undesirable portion a region of the target with a subset of features that change in the plurality of images of the target.

10. The apparatus of claim 6, further comprising a camera, wherein the image is provided to the processor from the camera.

11. The apparatus of claim 6, further comprising a camera, wherein the software causes the processor to detect the target in a captured image that is captured by the camera using the feature dataset for the target with the undesirable portion within the target excluded from the feature dataset.

12. A system comprising:
   means for providing an image of a target, the target being an object to be tracked using image based detection and tracking;
   means for identifying an undesirable portion within the target, wherein the undesirable portion is a dynamically changing region of the target;
   means for generating an image mask for the undesirable portion within the target;
   means for extracting features from the target in the image of the target to create a feature dataset for the target and using the image mask to exclude features within the undesirable portion within the target from the feature dataset for the target, wherein the means for extracting the features from the target in the image of the target to create the feature dataset for the target and using the image mask comprises means for overlaying the image mask on the undesirable portion within the target in the image of the target and extracting features within unmasked areas of the target or means for extracting features within all areas of the target in the image of the target and using the image mask to remove features extracted within the undesirable portion within the target from the feature dataset; and
   means for storing the feature dataset for the image based detection and tracking of the target, wherein the undesirable portion of the target is excluded from the feature dataset and features from remaining portions of the target are included in the stored feature dataset.

13. The system of claim 12, wherein the undesirable portion is a display screen or a reflective surface.

14. The system of claim 12, wherein the means for identifying the undesirable portion within the target comprises means for receiving a user input to identify the undesirable portion.

15. The system of claim 12, wherein the means for identifying the undesirable portion within the target comprises:
   means for providing a plurality of images of the target;
   means for extracting features from each of the plurality of images of the target;
   means for identifying a region of the target with features that change in the plurality of images of the target as the undesirable portion.

16. The system of claim 12, further comprising means for detecting the target in a captured image using the feature dataset for the target with the undesirable portion within the target excluded from the feature dataset.

17. A non-transitory computer-readable medium including program code stored thereon, comprising:
   program code to identify in an image an undesirable portion within a target, the target being an object to be tracked using image based detection and tracking;
   program code to generate an image mask for the undesirable portion within the target, wherein the undesirable portion is a dynamically changing region of the target;
   program code to extracting features from the target in the image of the target to create a feature dataset for the target and use the image mask to exclude features within the undesirable portion within the target from the feature dataset for the target, wherein the program code to extract features from the target in the image of the target to create the feature dataset for the target and use the image mask overlays the image mask on the undesirable portion within the target in the image of the target and extracts features within unmasked areas of the target or extracts features within all areas of the target in the image of the target and uses the image mask to remove a subset of the features that were extracted within the undesirable portion within the target from the feature dataset; and
   program code to store the feature dataset for the image based detection and tracking of the target, wherein the undesirable portion of the target is excluded from the feature dataset and features from remaining portions of the target are included in the stored feature dataset.

18. The non-transitory computer-readable medium of claim 17, wherein the undesirable portion within the target is a display screen or a reflective surface.

19. The non-transitory computer-readable medium of claim 17, wherein the program code to identify the undesirable portion within the target provides a user interface for a user to select the undesirable portion.

20. The non-transitory computer-readable medium of claim 17, wherein the program code to identify the undesirable portion within the target extracts features from each of a plurality of images of the target and identifies as the undesirable portion a region of the target with a subset of features that change in the plurality of images of the target.

21. The non-transitory computer-readable medium of claim 17, wherein the non-transitory computer-readable medium further comprises program code to detect the target in a captured image using the feature dataset for the target with the undesirable portion within the target excluded from the feature dataset.

22. The method of claim 1, wherein the undesirable portion is a portion of the object to be tracked.

23. The method of claim 1, further comprising tracking the target in a captured image using the feature dataset for the target with the undesirable portion within the target excluded from the feature dataset.

24. The apparatus of claim 6, further comprising a camera, wherein the software causes the processor to track the target in a captured image that is captured by the camera using the feature dataset for the target with the undesirable portion within the target excluded from the feature dataset.

25. The system of claim 12, further comprising means for tracking the target in a captured image using the feature dataset for the target with the undesirable portion within the target excluded from the feature dataset.

26. The non-transitory computer-readable medium of claim 17, wherein the non-transitory computer-readable medium further comprises program code to track the target in a captured image using the feature dataset for the target with the undesirable portion within the target excluded from the feature dataset.

* * * * *